US007014251B1

(12) United States Patent
Husk (10) Patent No.: US 7,014,251 B1
(45) Date of Patent: Mar. 21, 2006

(54) WINDOW SEAL METHOD AND APPARATUS (76) Inventor: Vernon 'Russ' Husk, 1425 Dike Rd., Mount Vernon, WA (US) 98273

( * ) Notice: Subject to any disclaimer, the term of this patent is extended or adjusted under 35 U.S.C. 154(b) by 0 days.

(21) Appl. No.: 10/726,385

(22) Filed: Dec. 2, 2003

Related U.S. Application Data (60) Provisional application No. 60/449,218, filed on Feb. 24, 2003.

(51) Int. Cl.
*B60P 3/373* (2006.01)
(52) U.S. Cl. .................. 296/166; 296/1.06; 49/475.1; 277/630; 277/644
(58) Field of Classification Search ............... 296/166, 296/1.06; 49/483.1, 68, 475.1; 277/630, 277/621, 644, 650
See application file for complete search history.

(56) References Cited

U.S. PATENT DOCUMENTS

| 3,837,700 A | 9/1974 | Van Slyke |
| 3,840,266 A | 10/1974 | Carlson |
| 4,114,943 A | 9/1978 | Engelhard |
| 4,294,485 A | 10/1981 | Engelhard |
| 4,616,871 A | 10/1986 | Pettit |
| 5,516,185 A | 5/1996 | O'Donnell et al. |
| 5,924,762 A | 7/1999 | Pols |

OTHER PUBLICATIONS

Monmouth Products webpage (http://www.rubberplastics.com/products.htm), 2001.*

* cited by examiner

*Primary Examiner*—Patricia L. Engle
(74) *Attorney, Agent, or Firm*—Michael F. Hughes; Hughes Law Firm, PLLC (57) ABSTRACT

An elongate moldable, flexible material or sealing body positioned between adjacent walls of a pickup truck and canopy mounted to a pickup truck bed, to permit windows of the pickup cab and canopy to be open for communication between the cab space and the canopy space, as well as to keep out wind, rain, dust and debris. The sealing body encompassing the perimeter of the windows of the cab and canopy. The sealing body also having a width dimension greater than its thickness dimension. Further, the sealing body having the ability to rotate about its central axis to accommodate varying dimensions of gaps between the cab wall and the canopy wall. The sealing body also having a fast compression rate and a compression memory. The slow expansion rate or "slow memory" giving the added benefit of avoiding abrasion of the sealing body against the cab or canopy walls due to vibration of the cab or canopy structure.

16 Claims, 6 Drawing Sheets

WINDOW SEAL METHOD AND APPARATUS

RELATED APPLICATIONS

This application claims the benefit of U.S. Provisional Application 60/449,218 filed on Feb. 24, 2003.

BACKGROUND OF THE INVENTION a) Field of the Invention

The present invention relates generally to devices used with pickup trucks that include a canopy over the truck bed and, more particularly, to devices especially adapted for providing a seal between a truck cab window and the canopy window.

b) Background Art

Numerous devices adapted for providing a seal between a truck cab and a canopy sitting on a truck bed have been provided in the prior art. For example, U.S. Pat. No. 3,840,266 (Carlson), shows a sealing gasket of compressible material that is placed between a cab and cap. It is held in place by both its resilience and an adhesive element that bridges the space between the cab and cap, and contacts the seal material. U.S. Pat. No. 3,837,700 (Van Slyke) shows a sealing element which is between the cab and a vehicle carried camper and which is a tubular element which may be inserted in place and inflated to hold it in place.

The disclosure in U.S. Pat. No. 5,924,762 (Pols) provides an inflatable gasket that fits in the space between the cab and the cap. The outer surface is provided with ribs to improve adhesion to the body surfaces. U.S. Pat. No. 5,516,185 (O'Donnell et al) shows a cab to cap gap filler in which a moldable material in a tubular container is forced between the walls and tend to become wedged and retained in place. There are also magnets located in the device to hold it in an operative position.

U.S. Pat. No. 4,616,871 (Pettit) shows a camper shell boot that is placed between the cab and cap, and is maintained in place by its resilience. U.S. Pat. No. 4,294,485 (Engelhard) shows a boot or gasket that is placed between the cab and cap, one side being fixed to the window frames and the other held in place by magnet 27. The disclosure of U.S. Pat. No. 4,114,943 (Engelhard) provides a gasket device between the cab and cover on a truck in which the edges of the gasket are secured to the window frames of each element.

U.S. Pat. No. 3,840,266 (Carlson) shows a sealing gasket of compressible material that is placed between a cab and cap. It is held in place by both its resilience and an adhesive element that bridges the space between the cab and cap, and contacts the seal material.

While these patents may be suitable for the particular problem in which they address, they would not be as suitable for the purposes of the present invention as heretofore described.

SUMMARY OF THE INVENTION

One embodiment of the invention provides a sealing body which can be quickly and easily applied to fill a gap between a pickup truck rearward window and a canopy forward window. In doing so, communication between the cab and canopy is achieved. This seal keeps out unwanted wind, dust and debris when the communicating windows of the cab and the canopy are open to each other.

The sealing material is made out of an elongated moldable, flexible material. The sealing material has a fast compression rate and a very slow expansion rate. This "slow memory" of expansion avoids abrasion of the cab or canopy with any type of irritant such as dust or debris that may be between the seal and the cab or canopy. Any vibration of one wall will not be transferred to the other through the seal. Consequently the seal will not provide any substantial force which might cause scratching of either the cab surface or the canopy surface.

In one form the sealing body has two different dimensions, where the width dimension is substantially wider than the thickness dimension. Having these different dimensions is useful when there is a change in the gap dimension between the cab wall and canopy wall. The seal can be rotated around its central axis ninety degrees to fit more adequately between the adjacent surfaces as required.

DETAILED DESCRIPTION OF THE PREFERRED EMBODIMENTS

Figure 1:
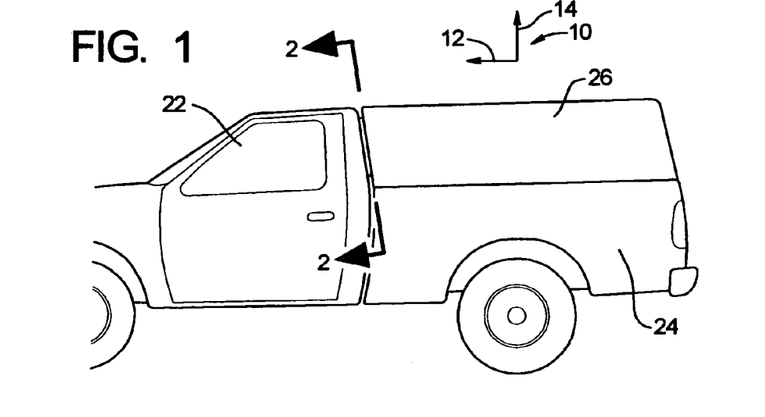
FIG. 1 is a side elevation view of a pickup truck with a canopy attached to the truck bed, where the seal of this invention is mounted in between the truck cab and canopy.
Figure 2:
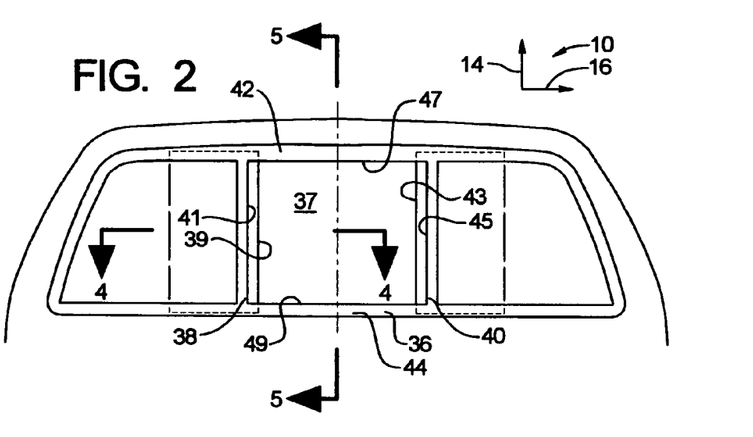
FIG. 2 is an elevation of the cab rear wall, with the center window of the cab shown in the open position.

In general, the disclosure herein relates to sealing the area between the very window on the cab of a truck, specifically a pickup truck, and the forward window of a canopy. For reference purposes as shown in FIG. 1, an axes system 10 is defined where the arrow indicated at 12 indicates a longitudinal direction and the arrow itself shows a forward direction. The arrow 14 shows a vertical axes. Referring to FIG. 2, the arrow 16 indicates a lateral axes. The axes system are shown for general reference and not intended to limit the invention but rather the description and the general direction and positioning of the components described herein.

There will now be a discussion of the overall operating environment followed by of form of an implementation of the present invention. As shown in FIG. 1, there is a conventional automotive vehicle, commonly known as a pickup truck which is indicated generally at 20. The truck comprises a cab region 22 having an interior cab cavity and truck bed region 24 positioned rearward of the cab region 22. A conventional canopy 26 having a canopy cavity region is mounted in the bed 24, the canopy 26 having a front wall 28 disposed closely adjacent and substantially parallel to the rear wall 30 of the cab 22. In FIG. 2, the rear cab wall 30 is shown as being provided with a cab rear window 32.

Figure 4:
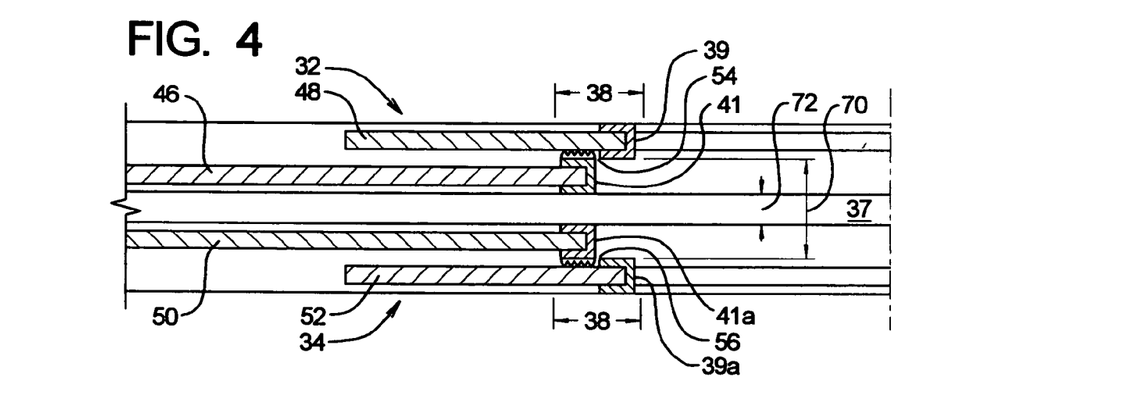
FIG. 4 shows a cross sectional view taken at line 114 in FIG. 2 of the cab rear wall, the lateral perimeter gap between the cab window and canopy, and front canopy wall.
Figure 5:
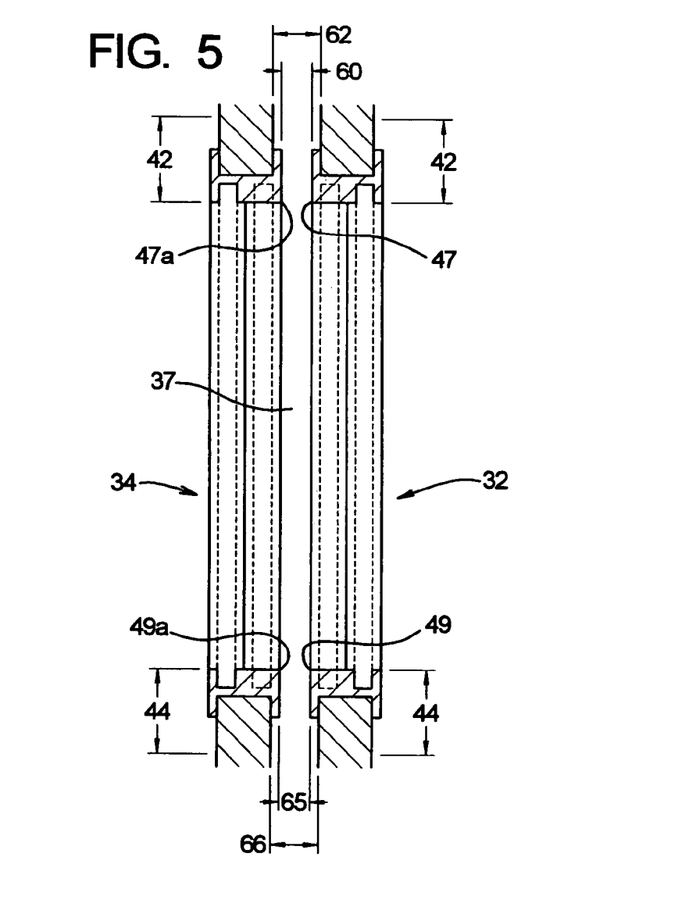
FIG. 5 shows a cross section view taken at line 5—5 in FIG. 2 showing the cab rear wall, the sealing body and the front canopy wall.
Figure 6:
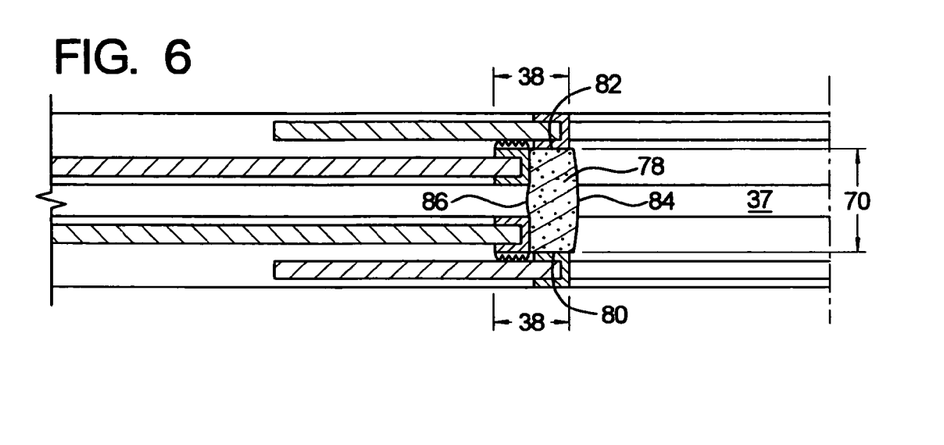
FIG. 6 shows a cross sectional view taken at line 6—6 in FIG. 3 showing the cab rear wall, the elongate member and the front canopy wall.
Figure 7:
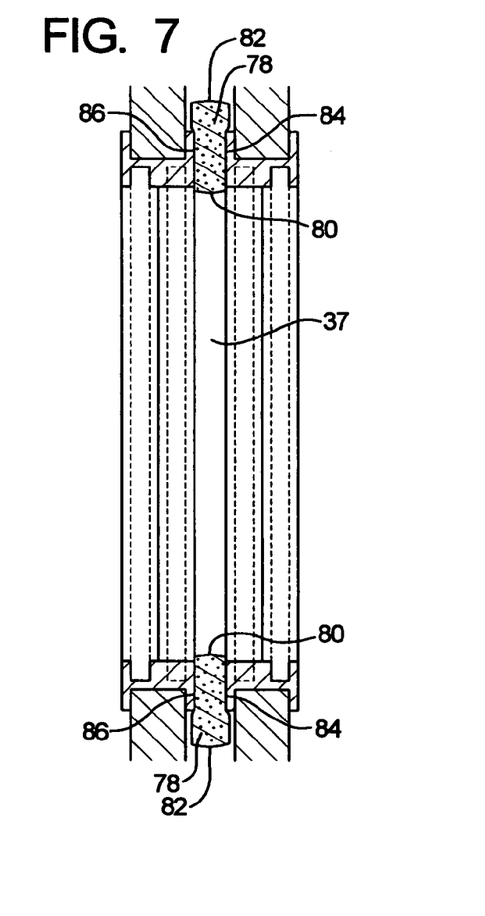
FIG. 7 shows a cross sectional view taken at line 7—7 in FIG. 3 showing the cab rear wall, the elongate member and the front canopy wall.
Figure 12:
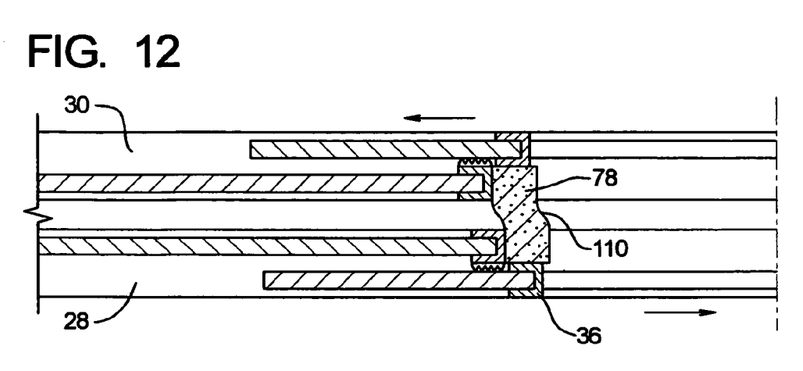
FIG. 12 shows a dynamic view where the cab wall moves with respect to the canopy wall laterally for an instant where the elongate member maintains a seal.
Figure 13:
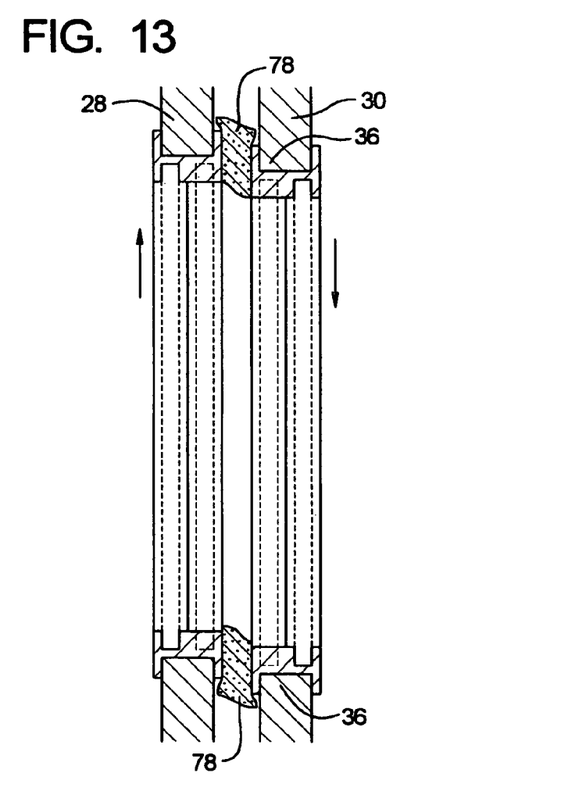
FIG. 13 shows a dynamic view where the cab wall moves with respect to the canopy wall vertically for an instant where the elongate member maintains a seal and like FIG. 12, the abrupt motion that generally occurs is not invoke the compression memory of the elongate member.

The cab rear window has a first inner edge portion 39 (see FIG. 2). Alternatively the first inner edge portion can be positioned on the stationary window edge indicated at 41 (see FIG. 4). The inner edge portion is the inner most region of the window that can support the elongate member 78 as shown in FIGS. 6 and 12. The installer can choose which surface to place the elongate member depending upon the installation circumstances. The canopy has corresponding inner edge portions 39a and 41a. In a like manner, the second inner edge portion 43 and 45 as shown in FIG. 2 represent inner most regions of the window that can support the elongate member 78. The canopy has second inner edge regions for supporting the elongate member similar to the first edge regions 39a and 41a of FIG. 4 but on the opposite lateral side of the canopy window 34. As shown in FIG. 5, the upper inner edge 47 of the cab window 32 defines the innermost portion of the upper region 42 (defined below) that can engage the elongate member 78 as shown in FIGS. 7 and 13. The canopy window 34 has a similar inner edge portion 47a. Finally, located in the lower portion of the cab window 32 in FIG. 5 there is a lower inner edge 49 and the canopy window 34 has a lower inner edge 49a. The lower edges 49 and 49a are the inner most regions that can support the elongate member 78 as shown in FIGS. 7 and 13.

The cab rear window 32 and the canopy front window 34 comprise a perimeter region 36 that is at an approximate location surrounding the central open area 37. More specifically, the cab window perimeter region 36 comprises a first and second lateral perimeter regions 38 and 40. As shown in FIG. 4, the first lateral perimeter region 38 is the general area located laterally with respects to the central open the 37. The lateral perimeter regions are adapted to engage the elongate member 78 as described further herein.

The perimeter regions 36 of the cab rear window 32 and the canopy front window 34 further comprise an upper perimeter region 42 and a lower perimeter region 44. As shown in FIG. 5, the upper perimeter region 42 is positioned vertically above the lower perimeter region 44. It should be noted that the perimeter regions of the cab and the canopy are substantially aligned with respects to the longitudinal axes. However, the operational aspect of the perimeter regions is to provide a surface to engage the elongate member 78. Therefore, the definition of the perimeter regions 38, 40, 42 and 44 is defined broadly. For example, a perimeter region may be a glass portion or painted portion of either the cab window or the canopy window. It should be noted that the perimeter regions 38, 40, 42 and 44 have a corresponding longitudinal distance that can very amongst the various regions. In one form, the elongate member is adapted to address these changes in longitudinal distances for the various perimeter regions 38, 40, 42 and 44 as described further herein.

Figure 3:
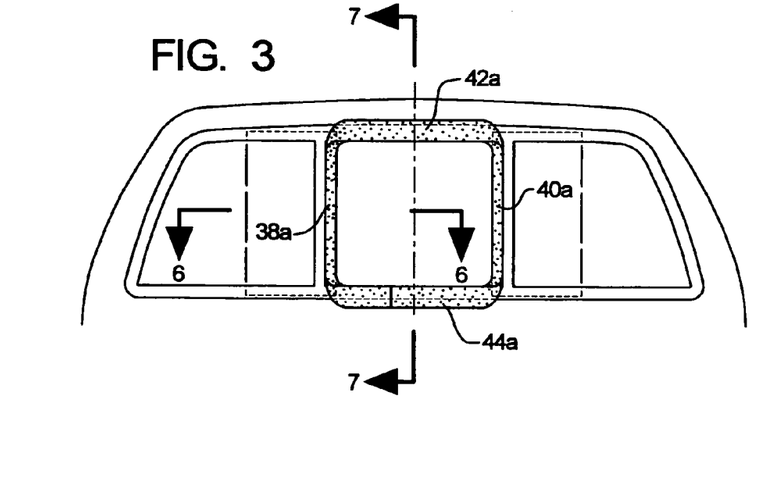
FIG. 3 is an elevation of the sealing body positioned to surround the open cab window, and also to encompass the open canopy window not shown.

The perimeter regions 38, 40, 42 and 44 each further comprise a cab sub-region that is the perimeter region on the cab and a canopy sub-region that is located on the canopy. Therefore as shown in FIG. 3, the first lateral cab sub-region 38a, the upper cab sub-region 42a, the second lateral cab sub-region 40a and the lower cab sub-region 44a comprise a cab sub-region. A similar canopy sub-region is comprised of like perimeter regions but located on the canopy portion. All of the sub-regions hereabove defined on the cab are collectively referred to as the cab perimeter sub-region and likewise all of the sub-regions hereabove defined on the canopy are collectively referred to as the canopy perimeter sub-region.

Therefore, in general the perimeter regions 38, 40, 42 and 44 are defined as the surface areas that can support the elongate member 78. The inner most point of the perimeter regions 38, 40, 42 and 44 is the corresponding inner edges cab and canopy windows 32 and 34 described above.

Now referring to FIGS. 4 and 5, the cab rear window 32 comprises a stationary portion 46 and a movable portion 48. Any similar manner, the canopy front window 34 comprises a stationary portion 50 and a movable portion 52. In most instances, sealing systems 54 and 56 are employed in the cab or window 32 and they canopy front window 34 respectively to keep moisture and the elements out on the cab and the canopy. Such a sealing system is accomplished with an interference fit between the movable portions of the windows and the stationary portions. Such an interference fit with a pliable rubber-like material is easier to accomplish when guide tracks or the like provide support for the movable window portions. As described further herein such a similar type seal can be maintained with an elongate member 78.

Figure 5A:
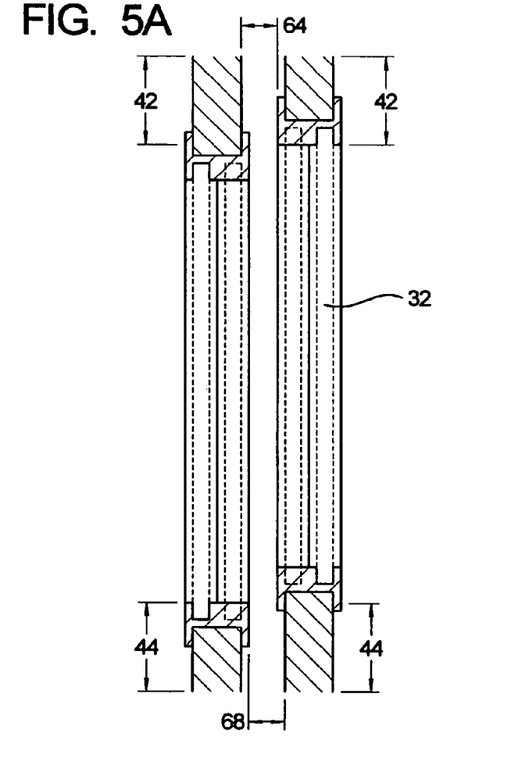
FIG. 5A shows a cross section view showing the cab rear wall, the lateral perimeter gaps where the upper and lower inner window edges are not aligned in the longitudinal direction.

Referring to FIG. 5, an upper longitudinal distance is indicated at 60. This is an approximate distance between the rearward surface of the cab and the forward surface of the canopy located at the upper perimeter region 42. Further, the distance indicated at 62 can function as another upper longitudinal distance. The various longitudinal distances are defined herein generally defined areas adapted to have the elongate member 78 to be mounted therein between. For example, referring to FIG. 5A, a situation may occur where the cab or window 32 is generally positioned vertically higher than the canopy front window 34. Alternately, the sizing of the windows may be sufficiently different where the edge portions of the transparent regions of the window are not aligned with respects to the longitudinal direction. In such a situation, the upper perimeter region 42 as shown in FIG. 5A has an upper longitudinal distance that is located at the area indicated at 64.

Now referring back to FIG. 5, the lower perimeter region 44 has a lower perimeter distance 65. In a similar manner as stated above, the lower perimeter distance may be at a lower region indicated at 66 if this is a suitable place for engaging the elongate member 78 described below. In an environment as shown in FIG. 5A, the lower perimeter distance indicated at 68 can be the distance between the sill portions of a window and the longitudinally opposing painted surface. As shown in FIG. 5A the painted surface is that of the cab and the window sill surface is on the canopy; however, the arrangement can be of any variety depending upon the circumstances of environment.

Figure 4A:
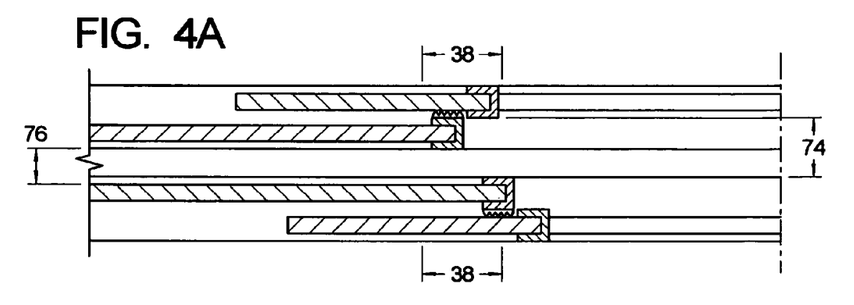
FIG. 4A shows a cross sectional view of the cab rear wall, the lateral perimeter gaps where the inner window edges are not aligned in the longitudinal direction.

Referring to FIG. 4, the first and second lateral perimeter regions 38 and 40 are now described with reference only to the first lateral perimeter region with the understanding the description is relevant to the second lateral perimeter region 40. The first lateral perimeter region 38 comprises a first lateral longitudinal distance 70. This distance defines a longitudinal distance that the elongate member 78 must span to provide a seal (see FIG. 6). In the alternative, in some situations the first lateral longitudinal distance may be the area and distance indicated at 72 in FIG. 4 whereby the sill or suitable surface is provided to allow the elongate member 78 to fit therein between the cab and the canopy. As shown in FIG. 4A the first lateral longitudinal distance can be the distance indicated at 74 or the distance indicated at 76 depending upon the particular installation environment. FIG. 4A shows a situation where the lateral width of the open region of the cab window is greater than the lateral width of the open region of the canopy. Of course these figures. are illustrated to show various installation environment and are not intended to limit the present invention to the particular installation environment. Rather, these illustrations are to show the versatility of the present invention to be retrofitted to a number of situations which of course far exceed the number of variations that can be shown in this disclosure.

It should be understood that discussion the first lateral longitudinal distances are relevant to the second lateral longitudinal distances. Normally, these distances would be the same in an installation; however, situations can occur where the first lateral longitudinal distance is not substantially the same as the second lateral longitudinal distance. This is handled in a similar manner as when the upper or lower longitudinal distances are not equal as well and such procedure for addressing the situations is described below.

Figure 8:
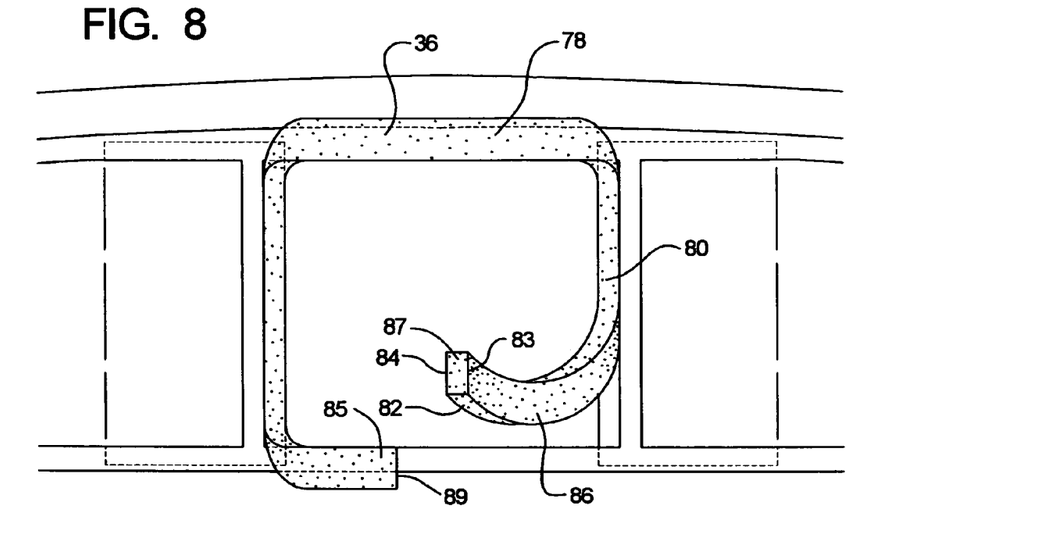
FIG. 8 shows a rearward view along the longitudinal axes of the elongate member being installed on to the perimeter sub-region of the front window.

There will now be a discussion of the method of sealing the central open area 37. As shown in FIG. 3, the elongate member 78 is attached to the perimeter region 36 (note, the canopy is not shown). As shown in FIG. 8, the elongate member 78 comprises a first surface 80 and a second surface 82. The first and second surface is 80 and 82 collectively are referred to as a first set of surfaces. The surfaces are substantially opposed to one another and adapted to fit in the perimeter regions between the cab and the canopy. The elongate member 78 further has a second set of surfaces that comprise a third surface 84 and a fourth surface 86. The third and fourth surfaces are substantially opposed to one another and adapted to be interposed between the various perimeter regions of the perimeter region 36. The elongate member also has in portions 83 and 85. Each end portion has an end surface 87 and 89. The end surfaces 87 and 89 are adapted to engage one another to make a complete seal around the perimeter region 36. In one form, the elongate member is cut to the proper overall length. Alternately, several components can be employed to make comprise an elongate member.

The elongate member 78 has special properties whereby the material from which it is made has compressible memory features. In other words, when the fall like material that comprises the elongate member 78 is compressed for a period of time (e.g. a few minutes) the foam will tend to remain in the compressed state and expand at a very slow expansion rate. In one form, the material comprising the elongate member 78 is a vinyl nitrate blend that is closed cell and sells under the trademark DURAFOAM™. One form of constructing the elongate member is a close cell PVC/neoprene foam with compression memory. The following test Ambient temperature 65° F. where the compressed surface was 2.5×4 cm and the fully expanded foam was four centimeters and the foam sample was compressed to two centimeters for each trial run. The time for re-expansion was measured. The results are listed as Table 1 below:

TABLE 1

| Time Compressed = 50% | Time required to re-expand = 98% |
| --- | --- |
| 1 second | 5 seconds |
| 3 seconds | 10 seconds |
| 6 seconds | 12 seconds |
| 10 seconds | 15 seconds |
| 30 seconds | 1 minute |
| 1 minute | 3.25 minutes |
| 5 minutes | 45 minutes |
| 10 minutes | 5 hours |
| 30 minutes | 22 hours |

Compression of the material of the elongate member can be done with a modest amount of force and as shown in the first record above the expansion of the foam member to 98% of the original width occurs relatively quickly. The initial expansion is at a higher rate than the last portion of the expansion. This initial expansion rate is defined as a quick recovery and is particularly useful for addressing vibrations and sudden movements as discussed with reference to FIGS. 12 and 13 below. The slow expansion time indicated in the latter records of Table 1 further have a low recovery pressure that provides minimal pressure upon the contacting surface. As mentioned below, this is advantageous for reducing surface where upon the perimeter regions of the truck, particularly painted regions where grit is interposed between the elongate member 78 and the painted surface.

Figure 9:
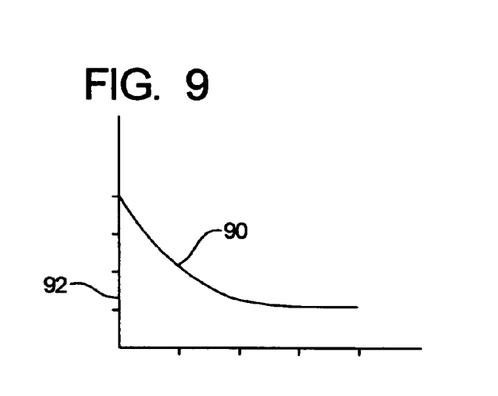
FIG. 9 shows a graph of the compression rate of the sealing material when a pressure is applied thereto.
Figure 10:
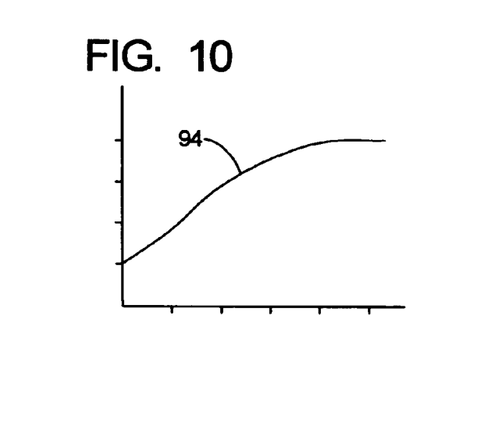
FIG. 10 shows a graph of the expansion rate or slow memory characteristics of the sealing material where the x-axis time units are in order of magnitude creature than the x-axis time units of FIG. 9.

As shown in FIG. 9, the x-axis indicates a relatively short time increments and the y-axis indicates the thickness of a portion of the elongate member 78 that has pressure applied thereto. The compression rate of the foam with a modest amount of pressure applied to the material will compress and a relatively fast rate as indicated by the line 90. When the material is held at a compressed position indicated on the y-axis at 92 and the pressure applied is released, the expansion rate as shown in FIG. 10 is in order of magnitude slower than the potential compression rate. For example, the x-axis units in FIG. 10 could be for example increments of days and, by way of contrast, the x-axis units in FIG. 9 could be for example seconds. The y-axis units are the same for both graphs in FIG. 9 and FIG. 10. The line 94 indication in expansion rate where the foam will return to its original size at a very slow rate. The compression memory is defined as the slow rate of recovery to an original size after a portion of the material is compressed for a period of time. The compression memory has a compression memory rate of expansion that is relatively slow. The period of time for compressing can be a few minutes (i.e. 5–30 minutes) or longer. The expansion rate following the compression memory can be approximately 1%–5% of the original cross sectional size expansion per hour to 3%—20% of the original cross sectional size expansion per day.

The expansion rate after the foam of the elongate member 78 has invoked the compression memory is slower than if the material of the elongate member 78 is compressed and shortly released which is referred to as the immediate expansion rate. This immediate expansion rate property of the elongate member 78 allows quick recovery of the elongate member 78. The quick recovery is necessary when sudden compression forces are exerted on the elongate member 78 such as when the vehicle is traveling or a sudden load is applied to the cab 22 or the canopy 26 causing relative movement therebetween. The elongate member 78 has a support system where an outward expansion force and a vertical frictional force, the sealing body being held in a stationary position through the combination of the outward expansion force and the vertical frictional force in the perimeter region where the compression member rate of expansion provides a minimal force to transfer between the cab wall and the canopy wall.

The memory expansion rate is the rate of expansion after the material of the elongate member 78 has invoked the compression memory. The memory expansion rate being at a low rate of expansion (compared to the immediate expansion rate), causes a lower pressure to be imparted on the surfaces of the perimeter regions 36 of the cab and canopy windows.

Figure 11:
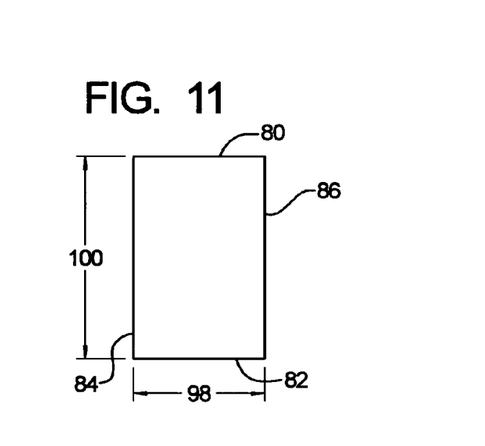
FIG. 11 shows a cross section of the sealing body shape.

Referring to FIG. 11, the elongate member is shown in a cross sectional view, where the elongate member has a sealing body width 98 that is greater than the sealing body thickness 100. The elongate member has had elongate axis that is defined for reference purposes where the elongate axes extends lengthwise of the elongate member and is roughly positioned in between the first and second set of surfaces. As will be described further herein, the elongate member 78 is adapted to be rotated about the elongate axes to provide various widths in the longitudinal direction for sealing the perimeter region 36 as shown in FIG. 1.

In general, the cross sectional shape of the sealing body 36 is can be rectangular, oval, round, square, or any other shape that will enable the sealing body 36 to seal the perimeter region 36 adequately. Further, a rectangular cross section provides for a first and second surfaces 80 and 82 that comprise the first set of surfaces and the second set of surfaces are comprised of the third and fourth surfaces 84 and 86. Of course other cross sectional modifications could be employed such as a hexagonal type shape providing a third set of surfaces which could have a different cross sectional distance than the first and second set of surfaces.

There will now be discussion of the benefits of the compression memory of the elongate member 78. Again referring to FIG. 9, the sealing body 36 is comprised of a material that has a very fast compression rate as shown by curve 90 where the compression can occur in a manner of seconds, and referring to FIG. 10, the sealing body has a very slow expansion rate or compression memory as shown by curve 94, where the expansion occurs over a period of hours or days. The slow memory as shown by curve 90 provides for low abrasion characteristic when dust or debris are located in-between the cab wall 30 or front canopy wall 28 at the perimeter region 36 and the surfaces 80, 82, 84 or 86 of the elongate member 78. Because the expansion rate is low, the pressure applied to the contacted surfaces in the perimeter region 36 is low. The vibrations and other motions that occur when the vehicle is traveling cause relative motion between the canopy 26 in the cab 22 of FIG. 1. Although the elongate member 78 is well adapted to handle these relative motions as described further below with reference to FIGS. 12 and 13, the force is minimal upon the surfaces. Therefore abrasive wear upon the surfaces of the cab and canopy in the perimeter region 36 is kept to a minimum.

Referring to FIG. 4, when mounting the sealing body 36, one method of installing the seal 36 is to open up the cab rear window 32 and the canopy front wall window 34. The next step is to compress the elongate member 78 into the either the large or small perimeter gap regions 38, 40, 42 and 44. Now referring to FIGS. 6 and 7, when a change in perimeter gap region size occurs the sealing body 36 can be rotated about its elongate axis to accommodate the change in gap size and the longitudinal direction. Now referring to FIG. 8, if the elongate member is not cut in more than one place than there is only a single juncture point at the end surfaces 87 and 89.

The elongate member 78 is supported through a combination of the expansion force of the elongate member 78 pressing against the cab wall 30 or canopy wall 28 of the perimeter region 36 and the vertical frictional force produced therefrom. Thus, the elongate member 78 will hold itself in place after being positioned by the user.

By sealing the perimeter region 36 between the canopy wall 28 and the cab wall 30, and expansion of the sealing body 36 protects against the entry of moisture and dust from the exterior. The elongate member 78 is of sufficient width 98 or thickness 100 between its first and second set of surfaces to provide adequate sealing between the canopy wall 28 and truck cab wall 30, even when having different dimensions between the cab 22 and canopy 26 occurs around the perimeter of the window forms, or such as when one wall slopes or curves differently in relation to the other.

With the elongate member 36 mounted between the cab 22 and front wall 28, the cab rear window 32 and the canopy front wall window 34 may be kept open as desired, for exchange of communication, air, or surveillance at all times without being significantly affected by rain, outside dust or other exterior weather conditions.

When it is desired to disengage the communication between the canopy 26 and cab 22, it is only necessary to pull the sealing body out of its stationary position, taking advantage of the fast compression rate as shown in curve 90 of FIG. 9. If the elongate member is found to be too short to provide a seal around the perimeter region, an extension piece can be used that in one form can be glued together with an adhesive such as Super Glue™. It has been experience that the adhesive does not interfere with the compression, sealing or expansion of the elongate member 78.

In most all pickup truck configurations, the bed portion has independent suspension than the cab portion. Therefore, when traveling or when loads are placed on either the cab or the truck bed, there is relative movement between the truck bed 24, which supports the canopy 26, and the cab 22. As shown in FIG. 12 and FIG. 13, there is relative movement between the canopy front wall 28 and the cab rear wall 30. As shown in this figure, the elongate member 78 is adapted to handle this repositioning whereby the central region 110 will flex in the lateral direction to a degree to allow for the movement. Because the compression memory is not invoked until the material that makes up the elongate member is held in a certain position for a duration of time, the brief relative movements between the cab in the canopy will not invoked a more static orientation of the elongate member 78.

As shown in FIG. 13, if they canopy front wall 28 is lifted a certain amount with respect to the cab rear wall 30, the elongate member 78 will adjust for this brief relative motion and still provide a seal around the perimeter region 36. Because the foam comprising the elongate member 78 has an immediate expansion rate when it is not held in place for a period of time, the elongate member 78 is particularly suited for vibrations and oscillatory movements between the cab 22 and the canopy 26 when traveling or otherwise imparting a force on either the cab or canopy 22 and 26 (e.g.

loading people in the cab or heavy supplies in the truck). The elongate member can be of a closed cell foam so it does not absorb water and it can dampen noise when traveling so the occupants of the cab can be in contact with the items or pets in the bed region and not suffer from the extreme road noise when the rear window is open.

From the foregoing, it will be appreciated that, although embodiments of the invention have been described herein for purposes of illustration, various modifications may be made without deviating from the spirit and scope of the invention. Accordingly, the invention is not limited except as by the appended claims.

I claim:

1. A sealing member adapted to be mounted in between a cab and a canopy where the cab has a rear window with a perimeter sub-region and the canopy has a forward window providing a perimeter subregion where the perimeter sub-regions of the rear window and the forward window are substantially aligned, the sealing member comprising:

an elongate axis and a first set of opposed elongated surfaces comprising a first surface and a second surface whereby the first and second surfaces are adapted to engage the perimeter sub-regions of the rear window and the forward window, the elongate member further having a second set of opposed surfaces comprising a third elongated surface and a fourth surface that are substantially opposed to one another and are adapted to simultaneously engage the perimeter sub-region of the rear window and the perimeter sub-region of the forward window, where a sealing body width is defined between the first and second surfaces that is a greater distance than a sealing body thickness that is defined as the distance between the third and fourth surfaces, whereas the elongate member is adapted to rotate substantially about its central elongate axis to provide engagement with the first and second opposed surfaces to the perimeter subregions of the rear window and the forward window or to provide engagement of the third and fourth opposed surfaces to the perimeter sub-regions of the rear window and the forward window where a combination of the engagement of the first and second opposed surfaces along a portion of the perimeter sub-region and the engagement of the third and fourth surfaces along another portion of the perimeter sub-region maintains a substantial seal between the cab and the canopy.

2. A elongate member adapted to be mounted between a cab and a canopy where the cab has a rearward window with a perimeter sub-region and the canopy has a forward window having a perimeter sub-region where the rearward and forward windows have a first lateral perimeter sub-region, a second lateral perimeter sub-region, and a lower perimeter sub-region and upper perimeter sub-region, the elongate member having the properties:

made from flexible material that is adapted to compress at a first rate and expand to an original cross sectional size at a second rate which is slower than said first rate whereby the elongate member is adapted to compress and frictionally engage between the first lateral perimeter subregion, the upper perimeter sub-region, the second lateral perimeter sub-region and the lower perimeter sub-region and after said engagement the material has compression memory where the expansion rate is further impeded and the pressure upon the first lateral perimeter sub-region, the second lateral perimeter sub-region, the upper perimeter sub-region and the lower perimeter sub-region and upper perimeter sub-region is reduced before the compression memory has set in where the elongate member has a central elongate axis and first and second surfaces that are substantially opposed to one another and have a first sealing member distance between the first and second surfaces and third and fourth surfaces that are substantially opposed to one another and have a second sealing member distance between the third and fourth surfaces where a combination of the engagement of the first and second opposed surfaces along a portion of the perimeter subregion and the engagement of the third and fourth surfaces along another portion of the perimeter sub-region maintains a substantial seal between the cab and the canopy.

3. The elongate member as recited in claim 2 where the first and second lateral perimeter sub-regions have a lateral longitudinal distance between the rearward perimeter sub-region and the forward perimeter subregion and the upper perimeter sub-region has a lateral longitudinal distance between the rearward perimeter sub-region and the forward perimeter sub-region whereby the lateral longitudinal distance is not the same as the upper longitudinal distance whereby the elongate member is adapted to rotate about the central elongate axis whereby the first and second surfaces are adapted to engage the first and second lateral perimeter sub-regions and the third and fourth surfaces are adapted to engage the upper perimeter sub-region.

4. The elongate member as recited in claim 3 whereby the lower perimeter sub-region has a longitudinal distance between the rearward perimeter sub-region and the forward perimeter sub-region and the third and fourth surfaces of the sealing member are adapted to engage the lower perimeter sub-region.

5. The elongate member as recited in claim 4 where the sealing member has a first end and a second end whereby the first and second ends are adapted to engage one another in a face-to-face engagement in between the rearward perimeter sub-region and the forward perimeter sub-region.

6. The elongate member as recited in claim 2 where the lateral regions are located on movable window sections of the forward window and the rearward window.

7. The elongate member as recited in claim 2, where the lateral regions are located on fixed window portions of the forward window and the rearward window.

8. A method of sealing a gap between a perimeter sub-region of a rearward window having rearward perimeter sub-region of a cab of a truck and a forward window having a forward perimeter sub-region of a canopy attached to the bed of a truck, a distance between the rearward perimeter sub-region in the forward perimeter sub-region defines a perimeter gap having a longitudinal distance that can vary with respect to position along the perimeter sub-region, the method comprising the steps of:

retrieving an elongate member having a central elongate axis and being comprised of a foam-like material that is adapted to compress at a first rate and held at a compressed position to invoke compression memory and expand at a second rate that is substantially lower than said first rate, the elongate member having first and second surfaces that are substantially opposed to one another and third and fourth surfaces that are substantially opposed to one another, positioning the elongate member along the perimeter sub-region whereby the elongate member engages the rearward perimeter sub-region and the forward perimeter sub-region with either the first and second surfaces or the third and fourth surfaces depending upon the longitudinal distance of the perimeter gap where a combination of the contact of the first and second opposed surfaces along a portion of the perimeter sub-region and the contact of the third and fourth surfaces along another portion of the perimeter sub-region between the cab and the canopy maintains a substantial seal between the cab and the canopy.

9. An elongate member for use in filling a perimeter sub-region between a cab rear wall and a canopy forward wall capable of keeping out debris where the elongate member having properties comprised of:

a compression memory having a compression memory rate of expansion and a fast compression rate, a cross sectional form with a width dimension substantially greater than a thickness dimension, an adaptability to rotate the elongate member about an elongate axis which enables the elongate member to fill the gap as required where the combination of the surfaces of the elongate member and various widths engaging the perimeter sub-region between the cab rear wall and the canopy forward wall maintains a substantial seal there between, said elongate member having a support system having an outward expansion force and a vertical frictional force, the elongate member being held in a stationary position through the combination of the outward expansion force and the vertical frictional force in the perimeter sub-region where the compression memory rate of expansion provides a minimal force to transfer between the cab wall and the canopy wall, whereby substantially avoiding abrasion of a particle of dirt between the elongate member and the cab or canopy walls.

10. The elongate member of claim 9 where a rate of expansion that is substantially slow enough that after compression, the elongate member will not re-expand to its former shape for a period of hours.

11. The elongate member of claim 9 including a cross section shape that is substantially rectangular.

12. A method of sealing a gap between a cab back wall and a canopy front wall where the gap to be sealed has non-uniform distance from the cab back wall and a canopy front wall, the method comprising the steps of:

retrieving an elongate member having a central axis and a wide portion with a wider cross-sectional distance greater than a narrow portion where the narrow portion the and wide portion exist on the same cross-sectional plane, placing the elongate member in a perimeter gap region therein between the front cab and the back canopy, the perimeter gap region, rotating the elongate member about its central axis so as to accommodate the various gap widths between the back cab and canopy front wall, fitting the elongate member into the gap such that a wide portion of the elongate member is placed in large portions of the gap and a thin portion of the elongate member is placed in small portions of the gap so both the wide portion and the thin portion of the elongate member engage the non-uniform distance from the cab back wall and a canopy front wall, expanding the elongate member to substantially the width distance between the canopy front wall and the vehicle back cab wall along the gap region, supporting the elongate member in a stationary position where the elongate member has an outward expansion force and a vertical frictional force, the combination of the forces being enough to support the sealing body's stationary position.

13. The method as recited in claim 12 whereby the vehicle back cab has a painted surface.

14. The method as recited in claim 13 whereby the elongate member has a slow memory and rate of expansion which provides a sufficiently low force to prevent debris from scratching the surfaces of the cab.

15. The method as recited in the claim 12 whereby the elongate member is adapted to extend into a cavity region of a perimeter portion of a window frame on the cab back wall and frictionally engage therein.

16. The method as recited in the claim 12 above whereby the the elongate member is adapted to extend into a cavity region of a perimeter portion of a window frame and provide a circuitous route for dust and debris to break the seal between the cab region and the surrounding environment.

* * * * *